March 24, 1942.  M. W. HUBER  2,277,490
VALVE STRUCTURE
Filed Jan. 26, 1940
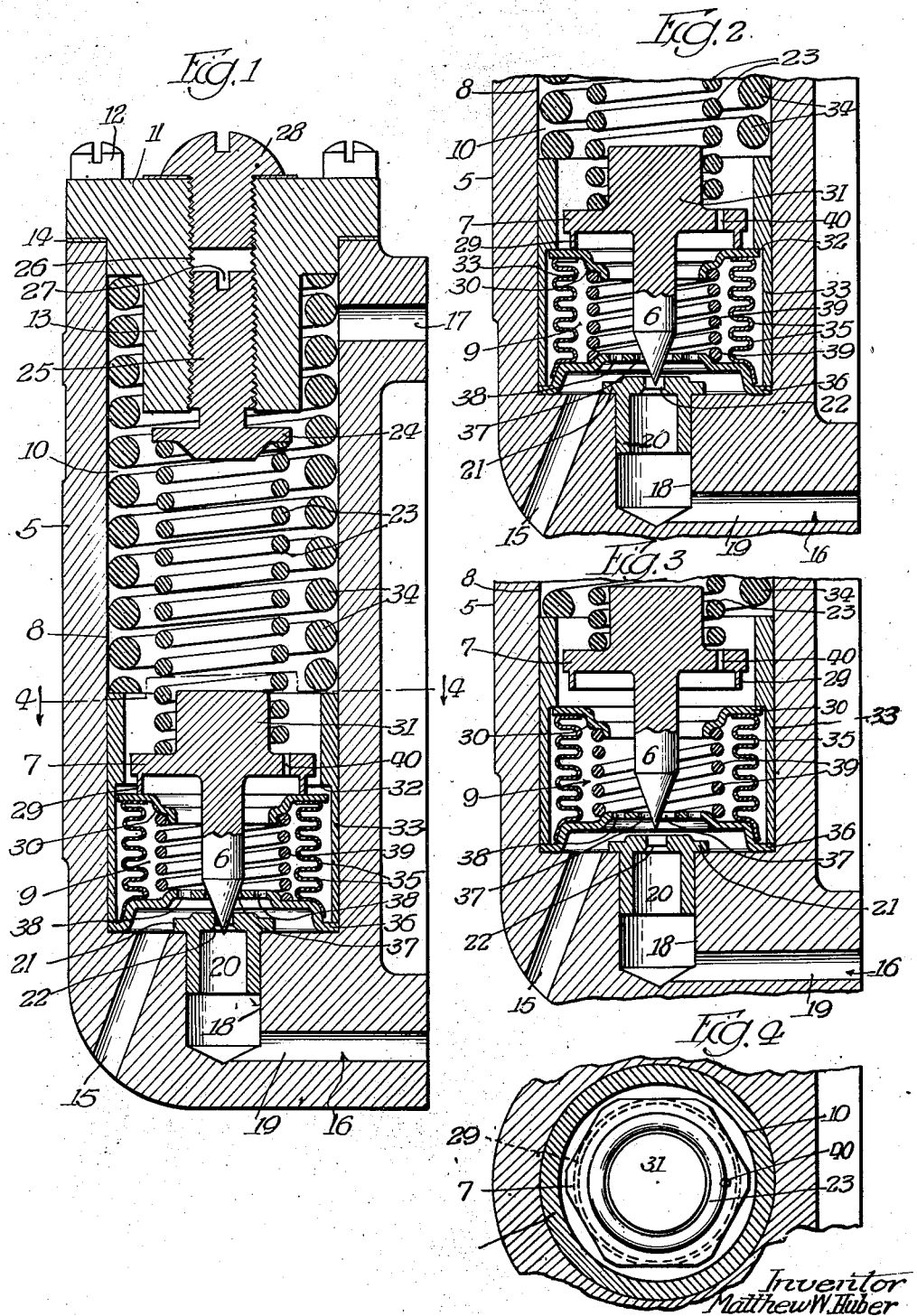
Inventor
Matthew W. Huber
By Fred Gerlach Atty.

Patented Mar. 24, 1942

2,277,490

UNITED STATES PATENT OFFICE 2,277,490

VALVE STRUCTURE

Matthew W. Huber, Chicago, Ill., assignor to The Tuthill Pump Company, Chicago, Ill., a corporation of Illinois Application January 26, 1940, Serial No. 315,789

20 Claims. (Cl. 137—153)

This invention relates to improvements in valve structures especially designed for controlling the outflow of liquid under pressure from pumps and maintaining a uniform pressure in a supply line, as for instance to the nozzle of an oil burner.

Among the objects of the invention is to provide a simple, safe and efficient valve structure of the character described, affording a quick or sharp cut-off for the liquid in order that air may be forced from the fan in the burner for a considerable period after the nozzle stops spraying.

Another object is to provide a valve structure in which the moving valve parts have no sliding contact with each other such as is the usual practice with so-called "piston type" valves heretofore employed for similar purposes, and thus overcome the difficulties commonly encountered with such piston type valves when the operating parts become carbonized or the main supply valve is caused to stand open due to dirt or other foreign matter collected in the moving parts of the valve.

Another object of the invention is to provide a valve structure of the type and character under consideration in which the various operating parts thereof are arranged in a compact manner within the housing and are so designed and constructed that they may be quickly and readily removed from the housing at the place of use for inspection or repair purposes and may be replaced in the housing without any fitting of parts.

A still further object of the invention is to provide a valve structure which is simple in design and not only may be manufactured or produced at an extremely low cost but also is extremely efficient in operation.

Other objects of the invention and the various advantages and characteristics of the present valve structure will be apparent from a consideration of the following detailed description.

The invention may best be understood by reference to the accompanying drawing, in which Figure 1 is a longitudinal section of a valve structure embodying the invention, the needle and by-pass valves being shown in their closed position, that is, the position in which they are disposed when the pump with which the structure is associated is not in operation and as a result there is no inflow of pumped liquid into the pressure chamber.

Figure 2 is a fragmentary section showing the structure immediately after starting of the pump, that is, with the needle valve in its open position but the by-pass valve closed.

Figure 3 is a similar fragmentary section showing both valves in their open position as the result of normal operation of the pump with which the structure is associated.

Figure 4 is a transverse section taken on the line 4—4 of Figure 1 and illustrating in detail the construction and design of the by-pass valve.

Referring to details of the embodiment of the invention shown in the drawing, the valve structure is enclosed in a vertically elongated casing 5 having a bore 8 therein with a liquid inlet 15 and a supply outlet 16 at the bottom thereof and a by-pass outlet 17 adjacent the top. The valve structure is primarily designed for use with a liquid pump (not shown) such as is used for supplying fuel oil to the nozzle of an oil burner, said pump having suitable connection to the inlet 15, and the oil burner nozzle being suitably connected to the supply outlet 16. As usual, the by-pass outlet 17 may have connection with a return line to the fuel supply tank.

The supply outlet 16 is controlled by a needle valve member 6 which engages a seat member 20 having a head 21 with an orifice 22 therethrough. Said seat member is fitted in a bore 18 formed concentric with the main bore 8 of casing 5 and communicating through the laterally extending duct 19 to the supply outlet 16.

The needle valve member 6 is herein shown as being integrally connected to a head or plate member 7 which forms the closure member of the by-pass valve structure, as will presently be more fully described. A coiled compression spring 23 engages the upper face of head 7 which is provided with an upstanding integral boss 31 for retaining the lower end of said coiled spring. The upper end of said spring is seated against a head-like enlargement 24 in the lower end of an adjusting screw 25 for controlling the compression of spring 23. As shown in Figure 1, said adjusting screw is threaded in a hole 26 formed within a reduced portion 13 of a cap 11 which forms a closure for the upper end of the casing 5. The cap 11 is suitably secured on the casing as by bolts 12. A gasket 14 may be interposed as usual between the cap and the top face of the casing.

The screw 25 may be manually adjusted from the exterior of the casing, in the form shown herein the upper end of the adjusting screw 25 terminating below the top of the cap 11 and being provided with a kerf 27 which may be reached by a screw-driver when the screw plug 28 is removed from the outer end of the threaded hole 26.

Referring now to the by-pass valve structure including the head 7, the latter consists of an extended flat plate having an annular depending flange 29 adapted to be seated in abutting engagement with the upper face of a valve seat member 30. Said seat member is mounted for vertical yielding movement on the upper end of a diaphragm or bellows member 35 which surrounds the needle valve stem 6.

The bellows member 35 is suitably fixed at its lower end within the casing 5 so as to form, in effect, a pressure chamber 9 below the by-pass valve plate 7. In the form shown herein, the lower end of said bellows member is welded or otherwise connected by a suitable liquid-tight joint to a cup-shaped disc 36 having a projecting skirt at its bottom which is secured in liquid-tight contact with the bottom of the bore 8 by pressure of the lower end of the sleeve 33, as will hereinafter more fully appear. A coiled compression spring 39 is disposed within the bellows member 35 between the valve seat 30 and the disc 36. This spring is lighter than the control spring 23 and operates in opposed relation thereto. In the form shown herein, the inner portion of the disc 36 at the bottom of the diaphragm member 35 has a centrally disposed hole 37 for centering the pointed lower end of the needle valve member 6 with respect to the outlet orifice 22, and also has a plurality of holes 38 permitting free communication of liquid between the inlet passage 15, the outlet orifice 22 and the main body of the pressure chamber 9 within the bellows member and below the by-pass valve member 7.

The sleeve 33 affords a convenient means of assembling the valve structure and maintaining the bellows member in place within the casing. The bottom face of said sleeve presses the flanged skirt of the disc 36 against the lower end of the bore member 8, and extends upwardly to a point substantially above the by-pass valve 7. Said sleeve is held in place by a relatively heavy retaining spring 34 which surrounds the valve control member 23 and the reduced part 13 of cap 11. Said spring abuts the head of said cap and is maintained under substantial compression thereby when the cap is normally in place on the casing.

The sleeve 33 also has a downwardly facing annular shoulder 32 formed on the inner face thereof, normally spaced slightly above the valve seat member 30 but arranged to limit the upward movement of the latter when the pressure within the chamber 9 reaches a predetermined value, as will presently be more fully described.

The by-pass valve plate 7 is spaced from the inner walls of sleeve 33 and may also have its lateral margin formed with flattened sides in a generally hexagonal shape, as clearly shown in Fig. 4, so that when said valve plate is in open position relative to its valve seat, liquid may flow freely around its outer margin and into the by-pass chamber 10 for escape through the by-pass outlet 17.

If desired, a bleed port 40 may be formed in the by-pass valve 7 so as to permit any gas or air which is pumped with the liquid into the pressure chamber, to escape into the by-pass chamber 10.

The operation of the valve structure above described is as follows: When the pump with which the valve structure is associated is not in operation so that there is no pressure in the pressure chamber 9, the needle valve 6 and the by-pass valve 7 are maintained in their closed positions as shown in Fig. 1, under pressure of the control spring 23. When the pump is started, sufficient pressure is built up in the chamber 9 to exert pressure on the under face of the by-pass valve 7, so as to cause said by-pass valve together with the needle valve 6 to move upwardly together in unison against the pressure of spring 23. During the initial upward movement of the two valve members, however, only the needle valve 6 is opened, because the valve seat 30 acting under the yielding tension of bellows member 35 and the coiled spring 39 therein, follows the by-pass valve member 7 upwardly until the outer periphery of valve seat 30 comes into engagement with the fixed shoulder 32 on sleeve 33 so as to limit further upward movement of said valve seat member. Thereupon any further increase in pressure acting on the under face of the by-pass valve member 7 will unseat the flange 29 of the latter relative to the valve seat member 30 and permit escape of excess liquid from the pressure chamber 9 into the by-pass chamber 10 and thence into the by-pass outlet 17. By the valve action described, the pressure within the chamber 9 effective in the discharge of liquid through the needle valve outlet 22, will be limited to a value predetermined by the point at which the by-pass valve 7 opens. Thus, so long as the pump supplies liquid at sufficient pressure to cause the by-pass to remain open, the pressure at said needle valve outlet 22 will be maintained substantially uniform.

When the pump stops or pressure is otherwise reduced within the chamber 9, the compression spring 23 moves the by-pass valve head 7 downwardly, and the flange 29 is first brought into engagement with the valve seat 30 to close the by-pass valve. A further reduction of pressure then permits continued downward movement of the two valve members together with the seat 30 under yielding movement of the bellows member 35 and spring 39, until the needle valve 6 is finally brought into closed position with respect to the outlet orifice 22.

It will thus be observed that the valve seat 30 tends to follow the by-pass plate 7 and its flange 29 so as to delay opening of the by-pass valve relative to the needle valve 6 until the valve seat 30 engages and is arrested by the shoulder 32, and conversely, in the closing movement of the valve members, the outlet valve is closed slightly before the needle valve is closed. Owing to the relatively large area of the by-pass valve plate 7, the parts may be designed and proportioned so that the two valve members require only a very short travel between the closing of the by-pass valve and that of the needle valve. This effects a quick or sharp cut-off of the main supply valve, which is particularly desirable in an oil burner so that air will be forced from the fan and the burner for a considerable period after the nozzle stops spraying, which in turn assists in complete combustion and avoids the slight explosion which is usually experienced with a slow cut-off valve.

It will be observed further that in the preferred form shown in the drawing, the effective area of the by-pass valve plate 7 is determined by the diameter of its depending flange 29 which is substantially the same as the effective diameter of the bellows member 35 disposed in vertical alignment therewith below the valve seat 30. Due to this arrangement the hydrostatic pressure developed within the pressure chamber 9 is directly effective on the under face of the valve plate 7 in a direction to raise the valve members.

and the hydrostatic pressure has no appreciable effect on the endwise expansion or contraction of the bellows member itself. Consequently the bellows member serves primarily as a means of affording limited yieldable movement of the valve seat 30 with the valve plate 7, while maintaining a liquid seal to prevent escape of liquid around the by-pass valve into the by-pass chamber 10. My improved form of by-pass valve therefore operates without any sliding valve parts such as are present in ordinary piston-type valves and which render such valves especially subject to clogging or sticking due to foreign matter or gummy or solid impurities usually occurring in fuel oils, to the extent that such piston-type valves are often unsafe for use with oil burners. In this connection it will be observed further that in my improved structure, the depending flange 29 of the by-pass valve has limited seating area on the valve seat 30 so as to be constantly flushed when the by-pass valve is open. However, in case any foreign matter should accidently become lodged between the by-pass valve parts, proper closing of the needle valve 6 is always assured, due to the yieldability of the valve member 30. In fact, should the by-pass valve be kept partially open in this manner, the escape of liquid therethrough will tend to close the needle valve even sooner than under normal operating conditions.

Among other advantages of the valve structure hereinabove described is that it consists of a small number of parts which may be manufactured at a low and reasonable cost. Its component parts are compactly arranged, the entire structure may be readily dismantled in the field or place of use, and the operating parts may be readily reassembled without any special fitting of parts. Should it be desired to inspect the operating parts, it is only necessary to remove the cap 11 from the housing 5, whereupon the compression springs 23 and 34, the needle and by-pass valves, the sleeve 33 and the diaphragm 35 together with the valve seat 30 and its disc 36 may be removed by sliding them out of the bore 8. In order to reassemble the structure it is only necessary to drop the bellows diaphragm 35 with its ring-shaped seat 30 into the bottom of the bore 8, then lower into place the two valves and the sleeve 33, and finally after proper positioning of the compression springs 23 and 34, bolting the cap 11 into place.

Although the valve structure has been described as being particularly adapted for use in connection with oil burner fuel pumps, it is to be understood that it may be used for other purposes, in other capacities, and for other fluids.

Although I have shown and described one embodiment of my invention, it will be understood that I do not wish to be limited to the exact construction shown and described, but that various changes and modifications may be made without departing from the spirit and scope of my invention as defined in the appended claims.

Having thus described the invention what I claim as new and desire to secure by Letters Patent is:

1. A valve structure comprising a housing having adjoining pressure and by-pass chambers therein and also having an inlet for liquid under pressure leading to the pressure chamber and an outlet leading from the latter and in addition a by-pass leading from the by-pass chamber, outlet and by-pass valves in the housing adapted, upon flow of liquid into the pressure chamber and in response to the pressure of the liquid in said pressure chamber, to move into open positions wherein they permit part of the liquid in the pressure chamber to flow through the outlet and the remainder or excess to flow through the by-pass chamber into the by-pass, means for preventing flow of liquid from the pressure chamber into the by-pass chamber during initial opening of the valves, including a co-acting valve seat for the by-pass valve movable with said by-pass valve during its initial opening movement and arranged and adapted at the end of said movement to be arrested so that upon further opening of the by-pass valve communication is established between the two chambers, and means for retracting the two valves and said seat upon stoppage of the flow of liquid into the pressure chamber.

2. A valve structure comprising a housing having adjoining pressure and by-pass chambers therein and also having an inlet for liquid under pressure leading to the pressure chamber and an outlet leading from the latter and in addition a by-pass leading from the by-pass chamber, outlet and by-pass valves in the housing adapted, upon flow of liquid into the pressure chamber and in response to the pressure of the liquid in said pressure chamber, to move into open positions wherein they permit part of the liquid in the pressure chamber to flow through the outlet and the remainder or excess to flow through the by-pass chamber into the by-pass, means for preventing flow of liquid from the pressure chamber into the by-pass chamber during initial opening of the valves, including a co-acting valve seat for the by-pass valve movable with said by-pass valve during its initial opening movement and arranged and adapted at the end of said movement to be arrested so that upon further opening of the by-pass valve communication is established between the two chambers, and also including a flexible septrum-forming diaphragm between the housing and said seat, and means for retracting the two valves and said seat upon stoppage of the flow of liquid into the pressure chamber.

3. A valve structure comprising a housing having an elongated space therein with closed ends and one end part serving as a by-pass chamber and also having an inlet for liquid under pressure leading into the other end part of the space and an outlet leading from said other end part and in addition a by-pass leading from the by-pass chamber, a bellows type diaphragm in said other end part of the space having its outer end anchored and in sealed relation with the housing and its other end free and having its interior in communication with the inlet and outlet and defining a pressure chamber, a ring shaped valve seat connected to the inner end of the diaphragm and adapted when open to have part of the liquid in the pressure chamber flow therethrough into the by-pass chamber and thence to the by-pass, a valve in the pressure chamber for controlling the flow of liquid through the outlet, a plate type by-pass valve in the by-pass chamber and in connected relation with the outlet valve adapted to assume a closed position wherein it extends across and closes the seat and further adapted, upon flow of liquid into the pressure chamber and in response to the pressure of the liquid in said pressure chamber, to move toward the outer end of the by-pass chamber and away from the seat and cause opening of the outlet valve and resultant flow of liquid from the pressure chamber through the outlet and also into the by-pass chamber and to the by-pass, and means for retracting the by-pass and outlet valves into closed positions with respect to the seat and the outlet upon stoppage of flow of liquid into the pressure chamber.

4. A valve structure comprising a housing having an elongated space therein with closed ends and one end part serving as a by-pass chamber and also having an inlet for liquid under pressure leading into the other end part of the space and an outlet leading from said other end part and in addition a by-pass leading from the by-pass chamber, a bellows type diaphragm in said other end part of the space having its outer end anchored and in sealed relation with the housing and its other end free and having its interior in communication with the inlet and outlet and defining a pressure chamber, a ring shaped valve seat connected to the inner end of the diaphragm and adapted when open to have part of the liquid in the pressure chamber flow therethrough into the by-pass chamber and thence into the by-pass, a valve in the pressure chamber for controlling the flow of liquid through the outlet, a plate type by-pass valve in the by-pass chamber and in connected relation with the outlet valve adapted when there is no flow of liquid into the pressure chamber to assume a closed position wherein it extends across and closes or seats against the seat and further adapted, upon flow of liquid into the pressure chamber and in response to the pressure of the liquid in said pressure chamber, to move toward the outer end of the by-pass chamber and effect opening of the outlet valve and resultant flow of liquid from the pressure chamber through the outlet, said seat being adapted to follow the by-pass valve during initial opening movement thereof and thence to be arrested so that upon further movement of the by-pass valve opening of the seat takes place and a portion of the liquid in the pressure chamber flows to the by-pass via the by-pass chamber, and spring means for retracting the two valves and the seat upon stoppage of flow of liquid into the pressure chamber.

5. A valve structure comprising a housing having an elongated space therein with closed ends and one end part serving as a by-pass chamber and also having an inlet for liquid under pressure leading into the other end part of the space and an outlet leading from said other end part and in addition a by-pass leading from the by-pass chamber, a bellows type diaphragm in said other end part of the space having its outer end anchored and in sealed relation with the housing and its other end free and having its interior in communication with the inlet and outlet and defining a pressure chamber, a ring shaped valve seat connected to the inner end of the diaphragm and adapted when open to have part of the liquid in the pressure chamber flow therethrough into the by-pass chamber and thence into the by-pass, a valve in the pressure chamber for controlling the flow of liquid through the outlet, a plate type by-pass valve in the by-pass chamber and in connected relation with the outlet valve adapted when there is no flow of liquid into the pressure chamber to assume a closed position wherein it extends across and closes or seats against the seat and further adapted, upon flow of liquid into the pressure chamber and in response to the pressure of the liquid in said pressure chamber, to move toward the outer end of the by-pass and cause opening of the outlet valve and resultant flow of liquid from the pressure chamber through the outlet, a comparatively light compression spring positioned in the diaphragm and arranged so that it tends to expand the latter and cause the seat to follow and remain seated against the by-pass valve during the aforesaid movement of the latter toward said outer end of the by-pass chamber, stop means in said by-pass chamber for arresting movement of the seat after initial movement of the by-pass valve by the liquid so that further movement of said by-pass valve results in opening of the seat and flow of a portion of the liquid in the pressure chamber through the by-pass chamber to the by-pass, and heavy spring means for retracting the two valves and the seat upon stoppage of flow of liquid into the pressure chamber.

6. A valve structure comprising a housing having an elongated space therein with closed ends and one end part serving as a by-pass chamber and also having an inlet for liquid under pressure leading into the other end part of the space and an outlet leading from said other end part and in addition a by-pass leading from the by-pass chamber, a bellows type diaphragm in said other end part of the space having its outer end anchored and in sealed relation with the housing and its other end free and having its interior in communication with the inlet and outlet and defining a pressure chamber, a ring shaped valve seat connected to the inner end of the diaphragm and adapted when open to have part of the liquid in the pressure chamber flow therethrough into the by-pass chamber and thence into the by-pass, a valve in the pressure chamber for controlling the flow of liquid through the outlet, a plate type by-pass valve in the by-pass chamber and in connected relation with the outlet valve adapted when there is no flow of liquid into the pressure chamber to assume a closed position wherein it extends across and closes or seats against the seat and further adapted, upon flow of liquid into the pressure chamber and in response to the pressure of the liquid in said pressure chamber, to move toward the outer end of the by-pass chamber and cause opening of the outlet valve and resultant flow of liquid from the pressure chamber through the outlet, spring means for causing the seat to follow and remain in seated relation with the by-pass valve during movement of the latter toward said outer end of the by-pass chamber, a sleeve fitting within said other end part of the space and around the diaphragm and having on the interior thereof an annular stop shoulder for arresting movement of the seat after initial movement of the by-pass valve by the liquid so that further movement of said by-pass valve results in opening of the seat and flow of a portion of the liquid in the pressure chamber through the by-pass chamber to the by-pass, and means for retracting the two valves and the seat upon stoppage of flow of liquid into the pressure chamber.

7. A valve structure comprising an elongated housing having a longitudinal bore therein with one end closed and with its other end open and defining a by-pass chamber and also having an inlet for liquid under pressure leading into the one end of the bore and an outlet leading from said one end and in addition a by-pass leading from the by-pass chamber, a removable cap for closing the open end of the bore, a bellows type diaphragm in said one end of the bore having its inner end free and its interior in communication with the inlet and outlet and defining a pressure chamber, a ring shaped valve seat connected to the inner end of the diaphragm when open to have part of the liquid in the pressure chamber flow therethrough into the by-pass chamber and thence to the by-pass, a valve for controlling the flow of liquid through the outlet, a plate type by-pass valve in the by-pass chamber and in connected relation with the by-pass valve and adapted when there is no flow of liquid into the pressure chamber to assume a closed position wherein it extends across and closes the seat and further adapted, upon flow of the liquid into the pressure chamber and in response to the pressure of the liquid in said pressure chamber, to move toward the cap at the outer end of the by-pass chamber and cause opening of the outlet valve, spring means for urging the seat to follow and remain in seated relation with the by-pass valve during movement of the latter towards said cap, a sleeve fitting within said one end of the bore and around the diaphragm and having on the interior thereof an annular stop shoulder for arresting movement of the seat after initial movement of the by-pass valve by the liquid toward the cap so that further movement of said by-pass valve results in opening of the seat, a compression spring between the by-pass valve and the cap for retracting the two valves and the seat upon stoppage of flow of liquid into the pressure chamber, and a spring between said cap and the sleeve for holding said sleeve in place, the springs, valves, sleeve, seat and diaphragm being removable from the bore for inspection or replacement purposes upon removal of the cap.

8. In an automatic pressure-responsive valve structure, a casing having an inlet port, an outlet port and a by-pass port, a valve member for controlling flow through said by-pass port and directly responsive to the pressure in said casing for opening said by-pass port, a second valve member for controlling flow through one of the other ports and movable conjointly with said by-pass valve member, a yieldable valve seat member for said by-pass valve member, means urging both of said valve members in a direction to close the same against the pressure on said by-pass valve member, said yieldable valve seat being freely movable with said by-pass valve member in response to the pressure in said casing during the initial opening and final closing movements of said outlet valve member.

9. In an automatic pressure-responsive valve structure, a casing having a pressure chamber therein provided with an inlet port, an outlet port and a by-pass port, valve seats communicating with said outlet port and said by-pass port, a needle valve member for closing said outlet valve seat, a plate valve member for closing said by-pass valve seat, said needle valve and plate valve members being connected for movement in unison, spring means normally urging both of said valve members in a direction to close their respective valve seats, said plate valve member being directly responsive to pressure acting upon it through its valve seat from said pressure chamber in a direction to open both of said valve members against the compression of said spring means, the by-pass valve seat being yieldable with its valve member in response to the pressure in said pressure chamber so as to maintain its valve member closed during the initial opening and final closing movements of said needle valve member.

10. In a valve structure, a casing having a yieldable partition member therein partially defining a pressure chamber, said casing having a plurality of fixed ports communicating with said pressure chamber, and said partition member having a by-pass port therethrough, a needle valve member for one of said fixed ports and a plate valve member for said by-pass port providing the sole support for said needle valve member and having substantially greater effective closure area than the latter, said plate member being directly responsive to pressure in said pressure chamber in a direction to open both of said valve members.

11. In an automatic pressure-responsive valve structure, a casing having a yieldable partition member therein partially defining a pressure chamber, said casing having a plurality of fixed ports communicating with said pressure chamber, and said partition member having a by-pass port therethrough, a needle valve member for one of said fixed ports and a plate valve member for said by-pass port movable with said needle valve member and having substantially greater effective closure area than the latter, said plate member being directly responsive to pressure in said pressure chamber in a direction to open both of said valve members, and spring means normally urging both of said valve members into closed position against the yielding action of said partition member.

12. In an automatic pressure-responsive valve structure, a casing, a yieldable diaphragm member partially defining a pressure chamber in said casing, said casing having a plurality of fixed ports for ingress and egress of fluid, and said diaphragm member having a by-pass port therethrough, a valve member for one of said fixed ports and a second valve member for said by-pass port movable with said first named valve member, said by-pass valve member having a sufficient effective area directly responsive to hydrostatic pressure from within said pressure chamber to be movable in a direction to open both of said valves independently of the hydrostatic pressure effective on said diaphragm member.

13. A valve structure, a casing, a diaphragm member partially defining a pressure chamber therein, said casing having a plurality of fixed ports communicating with the exterior, and said diaphragm member having a by-pass port therethrough, a valve member for one of said fixed ports, and a second valve member for said by-pass port movable conjointly with said first named valve member and directly responsive to pressure in said pressure chamber in a direction tending to open both valve members, and means limiting the movement of said diaphragm member to cause quick opening and closing of said by-pass valve member at a predetermined pressure.

14. In an automatic pressure-responsive valve structure, a casing having an inlet port and a plurality of outlet ports, a yieldable bellows member partially defining a pressure chamber in one end of said casing, said bellows member having an independently supported movable end wall with a by-pass port therethrough, a needle valve member for one of said outlet ports, a plate valve member for said by-pass port mechanically connected to said needle valve member by means extending freely through said movable end wall, said plate valve member being responsive to the pressure in said chamber, and spring means at the opposite end of said casing operable on both of said valve members in opposition to the yielding action of said bellows member.

15. In an automatic pressure-responsive valve structure, a casing having an inlet port and a plurality of outlet ports, a yieldable, generally cylindrical bellows member partially defining a pressure chamber in said casing, said bellows member having a movable end wall with a by-pass port therethrough, a needle valve member for said outlet port disposed at one side of said movable end wall, and a plate valve member engaging said by-pass port disposed on the opposite side of said end wall, and connected with said needle valve through said by-pass port for conjoint movement therewith, said valve plate being directly responsive to the pressure from within said bellows member and having an effective pressure area substantially equal to the transverse cross-sectional area of said bellows member.

16. In an automatic pressure-responsive valve structure, a casing having a pressure chamber therein provided with an inlet port, an outlet port and a by-pass port, valves for controlling said outlet port and said by-pass port each having a valve seat, a needle valve member for closing said outlet valve seat, and a plate valve member for closing said by-pass valve seat, said needle valve and plate valve members being connected for conjoint movement, spring means normally urging both of said valve members in a direction to close their respective valve seats, said plate valve member having sufficient area to be opened by pressure acting upon it through its valve seat from said pressure chamber against the action of said spring means, the seat member of said by-pass plate member being yieldably engaged by its valve seat so as to move with the latter during the initial opening and final closing movements of said needle valve.

17. An automatic pressure-responsive valve structure comprising a casing having an elongated bore closed at one end and a plurality of ports in said closed end, a needle valve seat in one of said ports, an annular bellows member having one end anchored in sealed relation to the closed end of said bore and supporting an annular valve seat on its free end disposed for independent yielding movement within said bore, a needle valve member for said first named valve seat and a plate valve member for said annular-shaped valve seat, said plate valve member being connected through said annular valve seat for movement in unison with said needle valve member and engaging the outer face of said annular valve seat, spring means in the open end of said bore normally urging both of said valve members in a direction to close their respective valve seats, and a cap removably mounted at the upper end of said casing and maintaining said spring means under compression.

18. A valve structure comprising a casing having an elongated bore closed at one end and a plurality of ports in said closed end, a needle valve seat in one of said ports, a bellows member having one end anchored in sealed relation to the closed end of said bore and carrying an annular valve seat on its free end disposed for yielding movement within said bore, a needle valve member for said needle valve seat, a plate valve member for said annular valve seat, said plate valve member being connected through said annular valve seat for movement in unison with said needle valve member and engaging the outer face of said annular valve seat, a coil spring in the open end of said bore normally urging both of said valve members in a direction to close their respective valve seats, a sleeve removably mounted within the lower end of said bore having an inwardly projecting shoulder adapted to limit the expansive movement of said bellows member, a second coil surrounding said first named spring and engaging the upper end of said sleeve, and a cap removably mounted at the upper end of said casing having abutting engagement with both of said springs to maintain them under normal compression.

19. In a valve structure, a casing having a yieldable partition member therein partially defining a pressure chamber, said casing having an inlet port and an outlet port both communicating with said pressure chamber, said yieldable partition member having a by-pass port therethrough, a valve member for said by-pass port directly responsive to pressure in said pressure chamber in a direction tending to open said by-pass port, and a second valve member for said outlet port supported entirely by said first named valve member so that said second valve member is independent of any sliding engagement with adjacent parts of said valve structure.

20. In an automatic pressure-responsive valve structure, a casing, a pressure-responsive partition member defining a pressure chamber in said casing and free for valve-controlling movement therein, an inlet port and an outlet port both communicating with said pressure chamber, said partition member having a by-pass valve seat supported thereon for non-sliding movement in said casing, a valve member for said outlet port, a second valve member for said by-pass valve seat movable with said first named valve member and directly responsive to pressure in said pressure chamber, and means normally urging both of said valve members in a direction to close the same against the pressure on said second valve member.

MATTHEW W. HUBER.